UNITED STATES PATENT OFFICE.

ROBERT E. GORDON, OF WALLACEBURG, ONTARIO, CANADA.

PROCESS OF PURIFYING AND CLARIFYING RAW SUGAR-CANE JUICES.

1,094,436. Specification of Letters Patent. Patented Apr. 28, 1914.

No Drawing. Application filed March 31, 1913. Serial No. 758,081.

*To all whom it may concern:*

Be it known that I, ROBERT E. GORDON, a subject of the King of Great Britain and Ireland, residing at Wallaceburg, in the Province of Ontario and Dominion of Canada, have invented certain new and useful Improvements in Processes of Purifying and Clarifying Raw Sugar-Cane Juices, of which the following is a specification.

The invention relates to the manufacture of cane sugar and has particular reference to an improved process in which the raw juices are purified and clarified prior to concentration.

In carrying out my process I proceed as follows: The raw juices just as extracted from the cane are first heated to the boiling point; they are then cooled from 30° to 40°; after which the precipitated impurities—such as albuminoids, gums, etc.—are removed by decantation or filtration. The solution is then limed, preferably by introducing milk of lime to an amount equal to 3% of dry lime; and immediately following this treatment the solution is carbonated to neutrality. The temperature is then raised to 90° C., the lime carbonate being still present, the effect being to produce a slightly alkaline condition, due to the decomposition of the lime compounds saccharites, and bicarbonates. Following this the solution is filtered to remove impurities, the temperature of 90° C. being still maintained. The solution is next re-limed by the introduction of approximately from $\frac{1}{4}$ to $\frac{1}{2}$% of dry lime in the form of milk of lime. It is then re-carbonated to the point of neutrality; re-heated to restore the temperature to 90° C.; is filtered; and finally treated by a small amount of sulfurous acid, preferably in the form of gas, and operating mainly as a bleaching agent.

The essential feature of my improved process is, as I understand it, the removal of albuminoids and other organic impurities by heat treatment prior to the introduction of lime into the solution. This avoids the discoloring of the solution which would take place by the reaction of the lime upon said impurities if remaining in the solution, particularly where subjected to high temperatures. I have discovered that it is not necessary to neutralize the natural acid condition of the juices if the temperature is raised to 90° or higher immediately after extraction. Heretofore it has been deemed essential to add lime, or otherwise render the solution alkaline so as to prevent fermentation and the formation of invert sugar.

The treatment carried out as above set forth, results in the elimination of impurities and the clarification of the juices, so that the latter may be then concentrated and manufactured into white sugar without further purification.

What I claim as my invention is:

1. The process of purifying and clarifying raw sugar cane juices, comprising heating the juice as extracted from the cane to a temperature above 90° C. to precipitate impurities, removing the precipitated impurities, liming at low temperature, carbonating, raising the temperature to above 90° C. while the carbonate of lime is present in the solution, removing precipitated impurites, re-liming, re-carbonating, raising the temperature to above 90° C., removing precipitated impurities, and neutralizing the alkalinity of the solution.

2. The process of purifying and clarifying raw sugar cane juices, comprising heating the raw juices as extracted from the cane to a temperature above 90° C., cooling, removing precipitated impurities, liming, carbonating, raising the temperature to above 90° C., and again removing precipitated impurities.

3. The process of purifying and clarifying raw sugar cane juices, comprising the heating of the raw sugar juice as extracted from the cane to a temperature above 90° C., cooling and removing precipitated impurities, and subsequently treating the solution to alternate liming and carbonation to remove further impurities.

4. The process of purifying and clarifying raw sugar cane juices, comprising the heating of the same immediately following extraction from the cane to a temperature above 90° C., removing precipitated impurities, and subsequently refining by liming and carbonation.

5. The process of purifying and clarifying raw sugar cane juices, comprising the heating of said juices immediately after extraction to a temperature above 90° C., quickly cooling the solution, removing the precipitated impurities, and subsequently 5 purifying by liming, carbonation and filtration, maintaining a high temperature after the first carbonation.

In testimony whereof I affix my signature in presence of two witnesses.

ROBERT E. GORDON.

Witnesses:
   JAMES P. BARRY,
   DELBERT COLLINS.